Patented Feb. 8, 1938

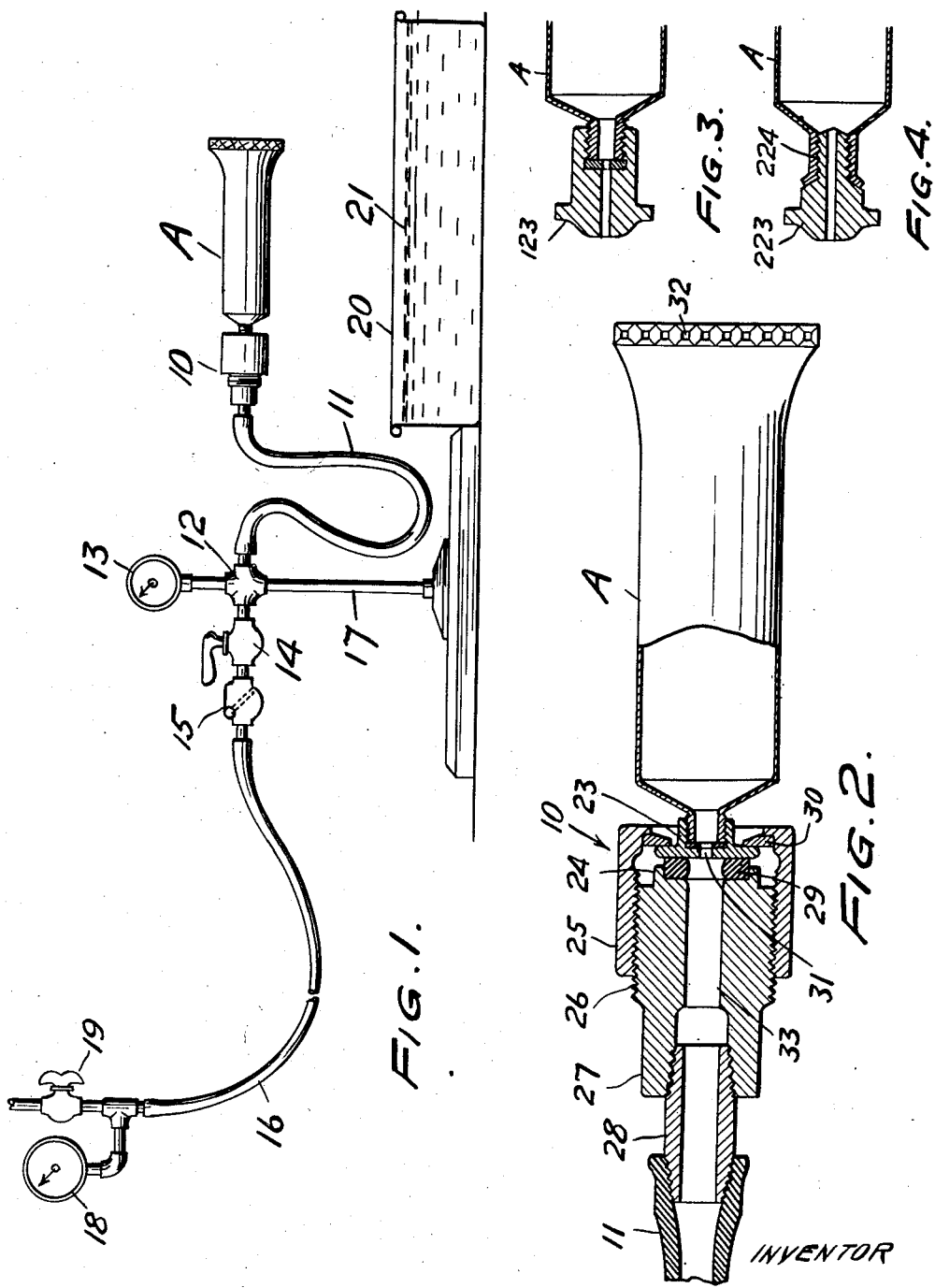

2,107,922

UNITED STATES PATENT OFFICE 2,107,922

COLLAPSIBLE TUBE TESTING APPARATUS

Charles J. Westin, Philadelphia, Pa., assignor to F. J. Stokes Machine Company, Philadelphia, Pa., a corporation of Pennsylvania Application January 19, 1934, Serial No. 707,255

1 Claim. (Cl. 73—51)

This invention relates to apparatus for testing containers, and more particularly to new and novel apparatus for determining the leak-resistance and bursting-strength of collapsible or flexible tubes.

The purpose of my invention is to furnish suitable means for conducting tests according to a definite plan and with the aid of some standard gas or other fluid.

Heretofore, as far as I am aware, no standard apparatus has been available for the making of tests to determine the comparative strengths of collapsible tubes and the closures of collapsible or flexible tubes. The few attempts made at testing tubes usually have been limited to the holding of the tube in the hand and exerting pressure on the walls by squeezing it with one or both hands, or by placing the tube on the floor and stepping on it. It is evident that no uniform results could be obtained by such unscientific methods and it was, of course, impossible to make any comparison of the strengths without any standard of measurement.

Stronger tubes and new types of closures are about to be placed on the market, and in order to determine the strength of these new types, as compared with the present type in common use, it is very desirable to have some standard way of conducting the tests. Some new types of closures and seals are disclosed in my co-pending applications, namely, Serial No. 561,111, filed September 4th, 1931, now Patent No. 2,028,112, and Serial No. 667,823, filed April 25th, 1933.

The methods referred to above, used at present in testing tubes, are, of course, unsatisfactory, and with the new types of closures, which provide a seal sometimes equal to or stronger even than the tube walls themselves, I have found it desirable to adopt a standard of measurement, to furnish suitable apparatus for applying pressure internally to the closed tubes, and to provide means whereby the pressures at any stage of the test may be read on a gauge and recorded for comparison.

I have found compressed air to be an ideal medium for testing tubes, and have therefore adopted this gas as the testing medium, although any other suitable fluid, gas or liquid may be used. Compressed air is cheap, convenient, clean and available in most establishments making or packaging tubes. Gauges, such as those made by Lonergan Company and known as "Inspectors' Test Gauges", are available in many sizes and for any required pressure, but are useless for my purpose without the proper mounting and proper adapter for connecting the tubes. An apparatus of this kind must be reliable so that accurate results may be recorded; it must be simple and convenient in its adaptation to the large variety of tubes now in use.

My invention embodies the following novel features and combinations:

Adapter for making a tight connection in the line between the source of supply of the testing medium and the interior of the tube.

A suitable valve for gradually admitting the test medium and slowly increasing the pressure up to the maximum required.

Means for introducing a suitable gauge in the line between the valve and the tubes to be tested.

Means for detecting and observing the pressure at which leaks occur and/or the pressure at which the tube bursts; and other features disclosed in the specification and claim.

In the drawing:

Fig. 1 is a diagrammatic view of a representative testing apparatus;

Fig. 2 is an enlarged view in section of the adapter with a tube partly in section and attached to the adapter;

Fig. 3 shows a modified adapter ring; and

Fig. 4 shows another adaptation of the connection to the tube.

Referring to the drawing, "A" represents a collapsible or flexible tube of the usual commercial construction, having the open end closed and sealed in any suitable manner, as at 32. Tubes or dispensing containers of this kind usually have a neck at one end with provision for closing the opening through the neck by means of a cap or plug. The most common method of closing this end is by means of a screw cap 23. The caps 23 are made from many different materials and in a large variety of sizes and shapes. Each cap usually has a head or flange of larger diameter than its body. This flange, when present, furnishes satisfactory means for clamping the tubes in the adapter. If, however, no cap is used, means may be provided as indicated in Fig. 3 or in Fig. 4. On account of the variation in sizes and shapes, one purpose of my invention is to furnish an adapter 10 of such construction that it can easily and cheaply be modified to fit any size or shape of cap. To this end, I furnish an adapter ring 30 of such outside diameter that an annular ring of sufficient body remains after the hole is made to fit the largest cap I desire to hold in the adapter. The adapter ring fits into the clamp-nut or chuck 25, which has internal threads to mate with the threads 26 on the adapter body 27. One end of nut 25 is provided with a shoulder, which fits over the adapter ring 30 to clamp it down tightly. The thread 26 is made of sufficient length to take care of any thickness of cap-flange or even straight caps without any flange. The adapter body may be made with an extension at one end suitable for connection to the air line 11, or the hole 33, which forms the path for the testing medium, may be threaded externally or internally for pipe connection 28. At the other end of the body 27 a seat is provided for a resilient gasket or washer 29. This gasket may be of any suitable material, such as rubber, sufficiently soft so that it will yield to any irregularity of the cap when the gasket is clamped down against it and form a tight seat under pressure. The adapter ring 30 may be made in a series of sizes with openings suitably varying in size from the minimum to the maximum size of caps to be held in it. The adapter ring 30 may also be made in many different shapes, to suit any desirable method of attaching the tube.

If the testing outfit is to be used in an establishment regularly using only a few standards of tube-cap threads, it is preferable to make adapter rings with the proper thread incorporated in them. This construction is not shown in the drawing. As shown in Fig. 3, suitable caps 123 of more durable material may be made and provided with a suitable gasket for the end of the tube neck to seat against. These caps are used in place of those ordinarily furnished with the tube.

Some tubes do not have screw-threads for attaching the cap, and in such cases a special cap 223 with a screw extension 224 thereon, as shown in Fig. 4, may be used. The screw extension 224 is adapted to be screwed into the soft metal forming the neck of the tube and to form a tight joint therewith.

Any type of pressure gauge 13 may be used, but I prefer the dial type known as the "Inspector's Test Gauge" having graduations up to 100 lbs. pressure per square inch. Such gauges are dependable, sensitive, easy to read, and sufficiently accurate. The gauge may be mounted on a stand 17, as shown in Fig. 1, or in any other suitable manner. The testing medium may be connected from the source of supply through a hose or pipe line 16. A valve 14, which may be an ordinary stop-cock or needle-valve, must be placed in the line 16. This valve 14 should be sensitive and easy to manipulate, so that it can be opened slowly to increase the pressure gradually. I have found it an advantage to place an auxiliary gauge 18 in line 16, in order to predetermine the available pressure before opening the line to gauge 13. If the source of testing medium is of a pulsating nature, it is desirable to have a check valve 15 in line 16. One convenient way of connecting line 16 with the gauge 13 and test-line 11 is by means of a T or cross 12. The test-line 11 may be connected to the adapter 10 in any suitable manner, or as referred to above. For convenience as well as for protection, the whole outfit may be housed in a portable case (not shown), but it can, of course, be permanently mounted in any suitable location.

When a test-medium, like air, is used for building-up internal pressure in the tube, I find it very effective to submerge the tube in a basin 20 containing a clear, transparent liquid 21, such as water. Any leaks in the tube or its closure will instantly be detected by air bubbles rising from the leak in the tube.

It is evident that an unobstructed passage must be provided to the interior of the tube from the test gauge 13, and, if the customary tube cap 23 is used to hold the tube "A" to the adapter 10, I therefore prepare the cap 23 by drilling a hole 31 through the top, and gasket (if any). I prefer to make this hole of about ⅛" diameter as a standard for all sizes. Any standard size hole may, of course, be adapted to suit conditions. Provision of such a standard opening tends to cause the pressure applied to each of the tubes to be uniform and to be smooth and gradual in its increase.

A suitable cap 23 for the tubes to be tested, having the standard hole 31, is placed in the adapter ring 30 and the clamp-nut 25 slipped over it and screwed down tight on body 26, so that the cap 23 is clamped tightly against gasket 29. It is, of course, desirable to have this connection tight and it will, therefore, sometimes be advisable to use a small gasket within the cap 23 in order to provide a tight seat for the end of the tube against the bottom of the cap. With the tube "A" securely attached to adapter 10, the tube is submerged in the testing-fluid and valve 14 slowly opened, so that, as the pressure rises, each graduation on the dial passed by the needle can be read off and the exact point at which leaks occur noted by the rising of air bubbles through the transparent liquid. Leaks may occur at any point in the tube walls or along the closure 32. It is usually possible to definitely determine the exact location of the leak so that a note may be made of the same, and, through an analysis of the records made for tests on a series of tubes, it is possible to determine just where the weak point in the construction of the tube is located. As soon as a leak is detected, it is advisable to remove the tube "A" from the testing-fluid, so as to avoid blowing the fluid out of the basin when the tube bursts.

For the low pressures required in testing tubes, particularly those in common use at the present time, I find the use of a gas as a test-medium for building-up the internal pressure and submerging the container to be tested in a transparent liquid a more convenient and efficient method to use, because when leaks occur at ½, 1, or a few pounds pressure, the air bubbles are just as clearly discernible as at higher pressures. If a liquid test-medium was used in making tests at the present low pressures, it would be extremely difficult to discover exactly at what pressure the leaks started, as the transparent liquid would slowly creep through the crack or pin holes, or merely seep through, taking an appreciable time before it could be detected on the outside of the wall of the tube. After the construction of the tube eventually is improved, so that pressures exceeding 50 lbs. become a common occurrence, it may be desirable to use a liquid-testing medium, and the principles disclosed in my invention are equally applicable to such a method of making tests. The liquid, of course, in that case would be confined within the container and suitably connected, so that the pressure could be increased gradually as required.

I do not intend to be limited save as the scope of the prior art and of the attached claim may require.

I claim:

Means for testing collapsible tubes, comprising in combination, a source of pulsating compressed air, a flexible tube leading to said source, an adapter having a passage therethrough for connecting a collapsible tube to be tested to said flexible tube, said adapter having a portion forming a cross-section of said passage of relatively small area compared to the area of the cross-section of said passage and of the inlet to said collapsible tube, a valve controlling the flow of air from said source through said flexible tube, a gauge connected to said source on the inlet side of said valve to indicate the pressure in said source, a second gauge connected to said flexible tube adjacent said adapter to indicate the pressure of air therein, and a check valve connected between said source and said valve so as to prevent the return of air from said flexible tube to said source.

CHARLES J. WESTIN.